United States Patent [19]

Anderson

[11] Patent Number: 4,893,655

[45] Date of Patent: Jan. 16, 1990

[54] DOUBLE VALVE MECHANISM FOR AN ACOUSTIC MODULATOR

[75] Inventor: Robert B. Anderson, Stanford, Calif.

[73] Assignee: The United States of America as represented by the Secretary of the Navy, Washington, D.C.

[21] Appl. No.: 397,549

[22] Filed: Aug. 23, 1989

[51] Int. Cl.[4] ........................ F16K 31/08; F16K 3/26; H04R 9/00

[52] U.S. Cl. ................................ 137/625.33; 251/65; 251/129.05; 251/129.01; 367/140

[58] Field of Search ..................... 137/625.33; 251/65, 251/129.05, 129.01, 129.1; 367/140, 143

[56] References Cited

U.S. PATENT DOCUMENTS 2,993,488 7/1961 Stec ............................ 137/625.33 X 4,483,369 11/1984 Akagi et al. ............... 137/625.33 X

*Primary Examiner*—Arnold Rosenthal

*Attorney, Agent, or Firm*—David S. Kalmbaugh; J. M. St.Amand

[57] ABSTRACT

A double valve mechanism which is the functioning part of an acoustic modulator which regulates airflow by creating air pressure variations. A pair of cylindrical shaped members, each of which has a plurality of elongated ports therein move relative to each other through electro-magnetic excitation. The motion of the two cylindrical shaped members is reciprocating causing the ports to first open and then close, thereby modulating the air flowing through the acoustic modulator. Linear motion of the cylindrical shaped members to displace the same port area is only one half of the linear motion required in a previous design, resulting in an acoustic energy output waveform having a frequency which is double the frequency of an electrical sinusoidal input signal supplied to the acoustic modulator.

10 Claims, 4 Drawing Sheets

DOUBLE VALVE MECHANISM FOR AN ACOUSTIC MODULATOR

BACKGROUND OF THE INVENTION

This invention relates generally to electro-mechanical modulators. In particular, this invention relates to a double valve mechanism for use with an acoustic modulator.

DESCRIPTION OF THE PRIOR ART

There are presently many types of electro-mechanical modulators and choppers in the prior art. One type of electro-mechanical modulator is an acoustic modulator which regulates air flow by creating air pressure variations which, in turn, creates acoustic energy. This acoustic energy is of a very high intensity, and is used to conduct noise and vibration testing on military aircraft, missiles and other weapons systems.

The functioning part of the acoustic modulator is the valve mechanism. Prior art valve mechanisms generally use a pair of cylindrical shaped members, each member of which has a plurality of ports which allow air to pass therethrough. The first member is generally stationary and the second member, which is electro-magnetically excited, moves relative to the first member. An electrical sinusoidal input signal is provided to the second member, to first align the ports of the second member with the ports of the first member and then move the ports of the second member out of alignment with the ports of the first member. This movement, in turn, first increases air flow and then decreases air flow through the valve mechanism of the acoustic modulator thereby generating air pressure variations at a frequency equal to the frequency of the electrical sinusoidal input signal.

Unfortunately, this prior art acoustic modulator consumes excessive amounts of air at partial modulation levels which is costly, provides excessive background noise, and has a frequency response which is unsatisfactory in the 800 to 1500 hertz frequency range.

SUMMARY OF THE INVENTION

The present invention involves a valve mechanism for an acoustic modulator comprising a pair of cylindrical shaped members each of which has a plurality of elongated ports for passing air therethrough. Each member has a coil which is positioned in a magnetic field such that when the coil of the cylindrical shaped member is excited by an electrical signal movement is imparted on the member. The motion of the two cylindrical shaped members is reciprocating causing the ports to first open and then close thereby modulating the air flowing through the acoustic modulator. Since both cylindrical shaped members now move, the linear motion required by each member to align ports and then pull ports out of alignment is only half the linear motion required by the prior art valve mechanism.

When a sinusoidal input signal is applied to the valve mechanism a frequency "doubling" occurs, that is the valve mechanism completes an open-close-open-close cycle. The frequency "doubling" is accomplished by the valve mechanism exposing the same open port area for both the positive going excitation waveform and the negative going excitation waveform of a sinusoidal input signal, while being closed when the signal passes through zero. Further, the present invention provides for a reduction in background noise and a reduction in air consumption.

Accordingly, it is an object of the present invention to provide a highly efficient double valve mechanism for extending the upper frequency performance of an acoustic modulator.

It is further an object of the present invention to provide a double valve mechanism for an acoustic modulator which will reduce air consumption and reduce background noise.

These and other objects, advantages and novel features of the invention will become apparent from the following detailed description of the invention when considered in conjunction with the accompanying drawings.

Figure 6:
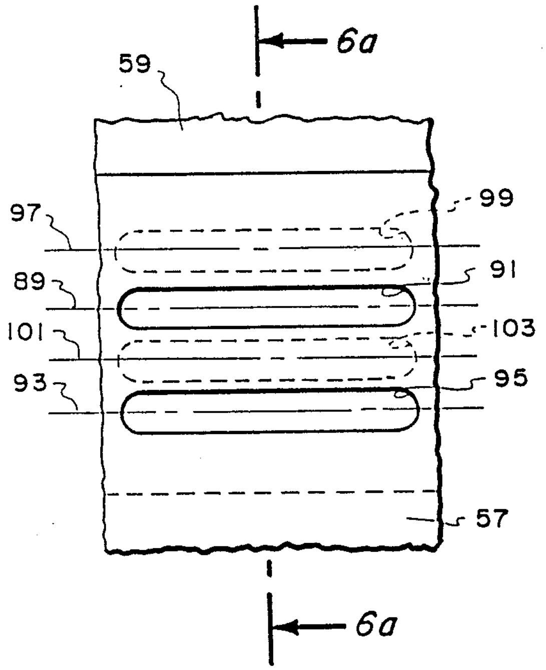
FIG. 6 is an enlarged view taken along line 6 of the cylindrical shaped ports of the double valve mechanism of FIG. 5.
Figure 7:
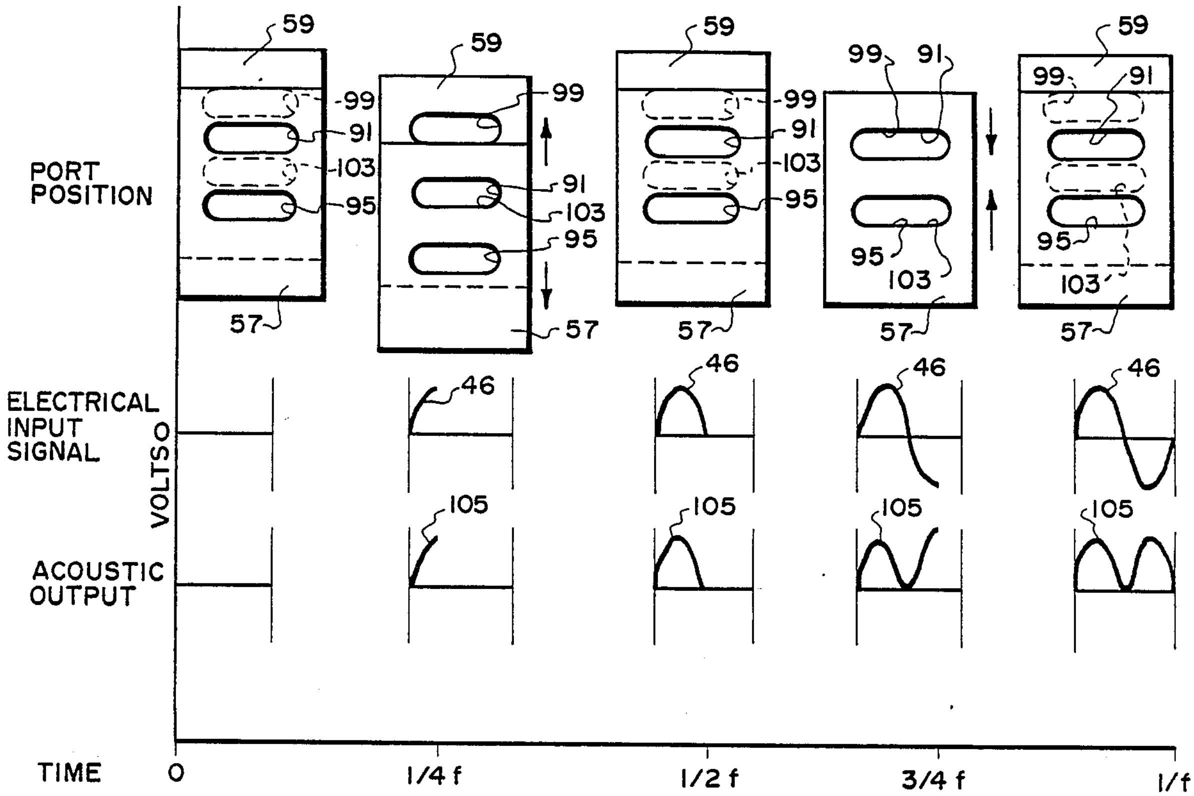
Figure 8:
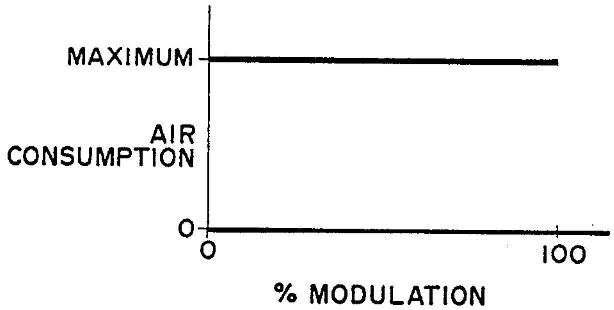
Fig. 8. PRIOR ART
Figure 9:
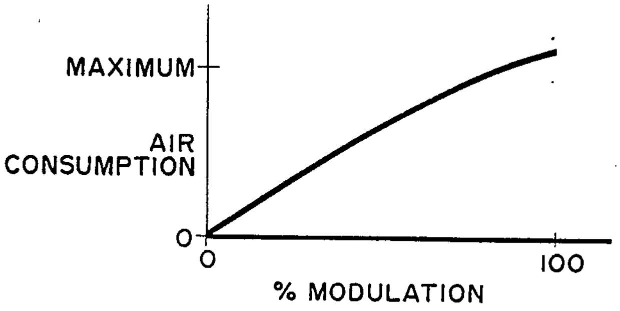

FIG. *6a* is a cross sectional view taken along line *6a–6a* of FIG. 6;

FIG. 7 is a graphical representation of the acoustic energy output generated by the acoustic modulator utilizing the double valve mechanism of the present invention;

FIG. 8 is a graphical representation illustrating air consumption versus percent of modulation for the prior art valve mechanism; and FIG. 9 is a graphical representation illustrating air consumption versus percent of modulation for the valve mechanism of the present invention;

DETAILED DESCRIPTION OF THE PREFERRED EMBODIMENT

The preferred embodiment of the present invention will now be discussed in some detail in conjunction with all of the figures of the drawings wherein like parts are designated by like reference numerals insofar as it is possible and practical to do so.

Figure 1:
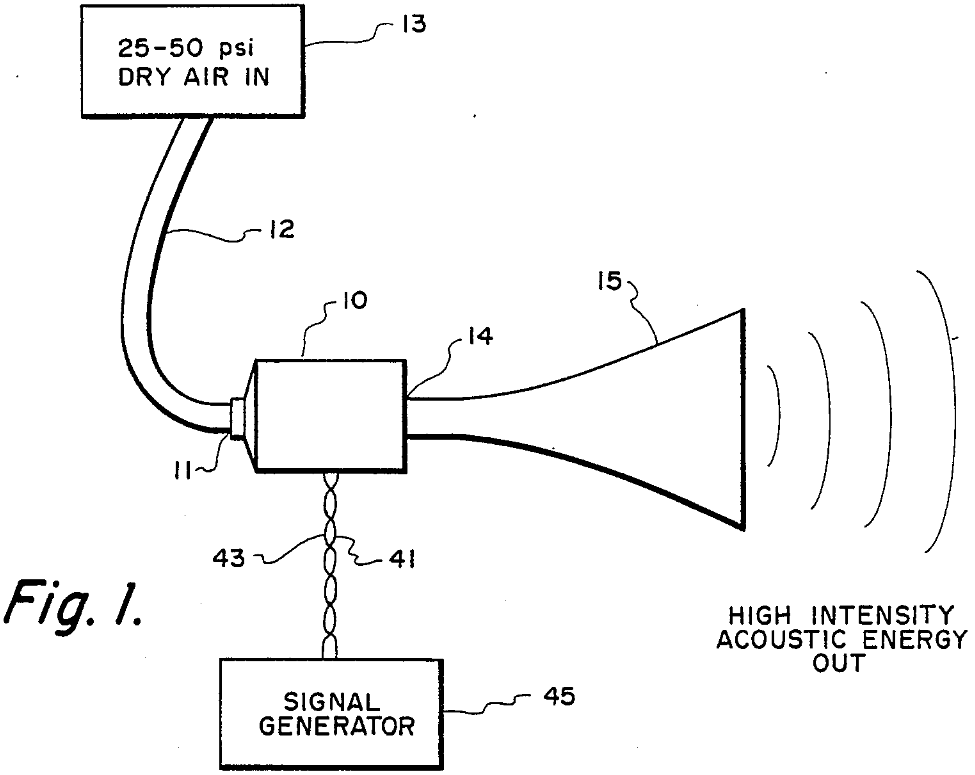
FIG. 1 is a side view of an acoustic modulator.

Referring first to FIG. 1, there is shown an acoustic modulator 10 which has an inlet port 11 connected by a hose 12 to a source 13, which provides dry air to modulator 10 at 25 to 50 psi. Acoustic modulator 10, in turn, modulates the air and provides at an outlet port 14 connected to a horn 15 a high intensity acoustic energy waveform.

Figure 2:
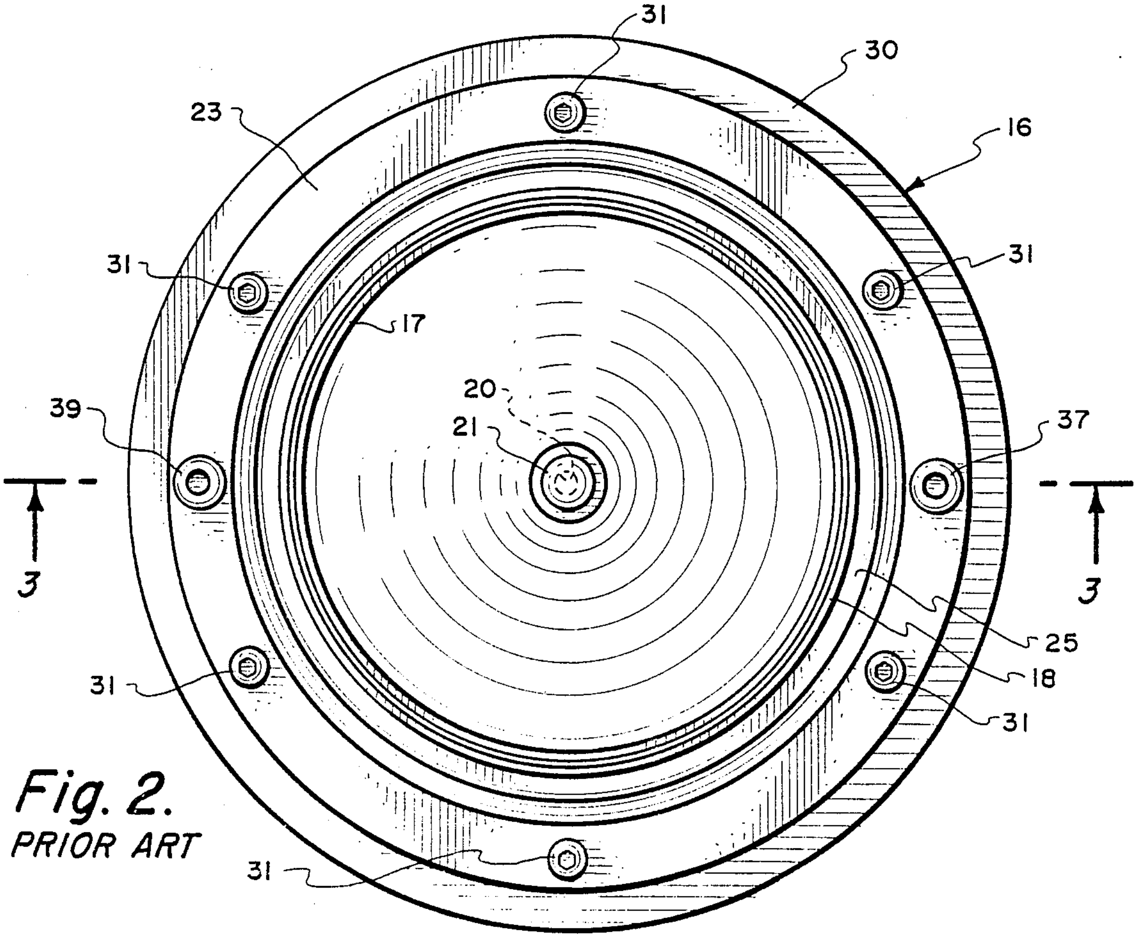
Fig. 2. PRIOR ART
FIG. 2 is a top view of a prior art valve mechanism for the acoustic modulator of FIG. 1.
Figure 3:
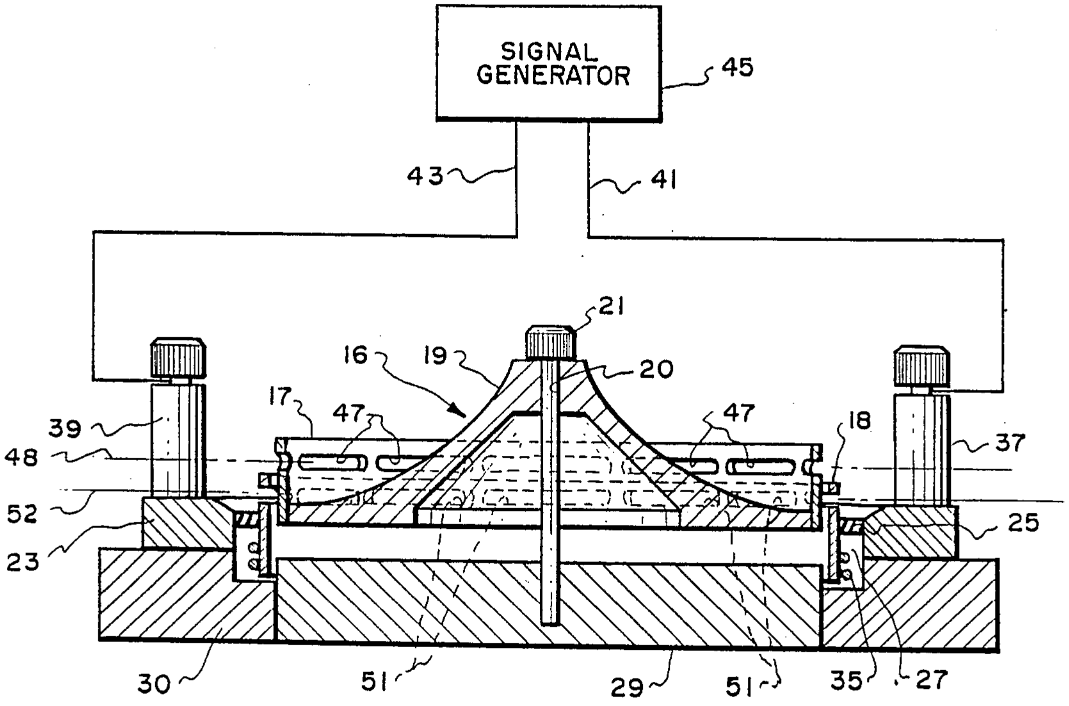
Fig. 3. PRIOR ART
FIG. 3 is a cross sectional view taken along line 5—5 of the prior art valve mechanism of FIG. 2.

Referring now to FIGS. 1, 2 and 3, there is shown a sectional view of a prior art valve mechanism 16 for use with acoustic modulator 10. Valve mechanism 16 comprises a pair of cylindrical shaped members 17 and 18 with member 17 being positioned within member 18. Cylindrical shaped member 17 is attached to a cone shaped support member 19 which has an aperture 20 through which a mounting bolt 21 passes so as to secure member 13 in a fixed position to acoustic modulator 10.

Cylindrical shaped member 18 is, in turn, secured to a mounting ring 23 by a flexible material 25 which allows movement of member 18 within a gap 27 located between a circular shaped permanent magnet 29 of acoustic modulator 10 and a mounting member 30 positioned circumferentially around magnet 29. A plurality of mounting bolts 31 secure ring 23 to mounting member 30 of acoustic modulator 10.

Wound around the outer surface and positioned near the lower end of cylindrical shaped member 18 is a coil 35 which has one end thereof connected to a terminal 37 attached to ring 23 and the opposite end thereof connected to a terminal 39 attached to ring 23. Terminals 37 and 39 are respectively connected by wires 41 and 43 to the first and second terminals of a signal generator 45 which generates an electrical sinusoidal signal 46, FIG. 4 having a frequency that may be varied by an operator, not shown.

Referring now to FIG. 3 cylindrical shaped member 17 has a plurality of elongated ports 47 located in a plane 48, while cylindrical shaped member 18 has a plurality of elongated ports 51 located in a plane 52.

Figure 4:
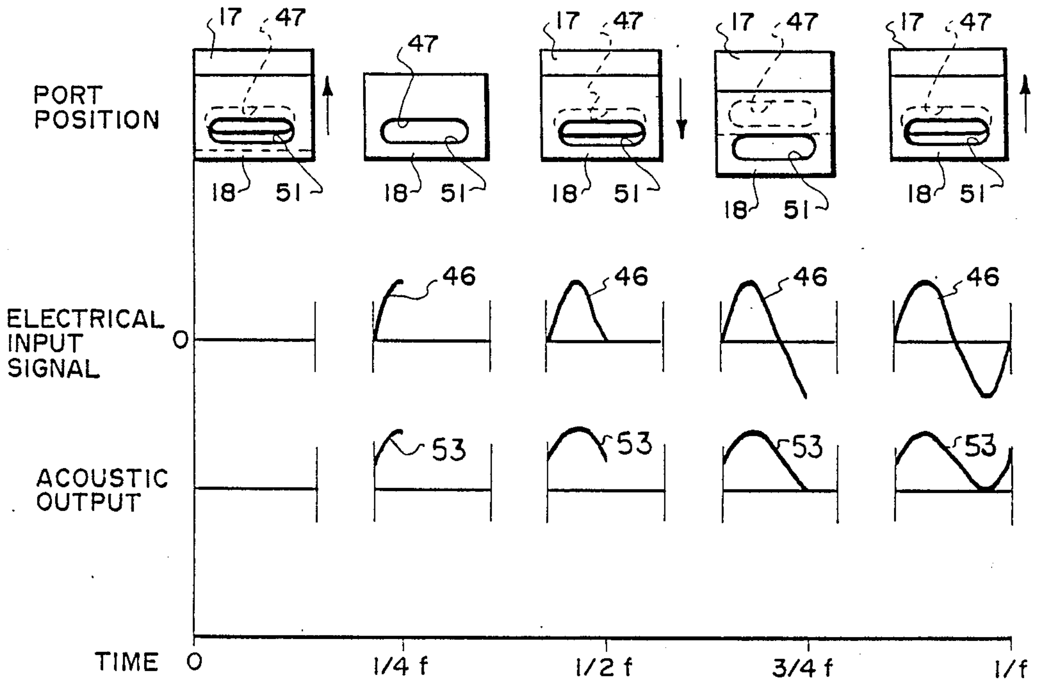
Fig. 4. PRIOR ART
FIG. 4 is a graphical representation of the acoustic energy output waveform generated by the acoustic modulator utilizing the prior art valve mechanism of FIG. 2.

The operation of the prior art valve mechanism will now be described by means of FIGS. 1, 3 and 4.

When electrical sinusoidal input signal 46 is positive, port 51 of cylindrical shaped member 18 is moved in the direction of the arrow such that port 51 is aligned with port 47 of cylindrical shaped member 17. Valve mechanism 11 is now in an open position allowing air to flow through aligned ports 47 and 51. When signal 46 goes negative, port 51 is moved in the direction indicated by the arrow such that port 51 is pulled out of alignment with port 47 and valve mechanism 16 is now in a closed position stopping the flow of air through valve mechanism 16.

This results in an acoustic energy output waveform 53 being generated by acoustic modulator 10 which has a frequency equal to the frequency of input signal 46. Unfortunately, when operating in the 800 to 1500 hertz frequency range, the acoustic energy provided by acoustic modulator 10 is not satisfactory for testing purposes.

Figure 5:
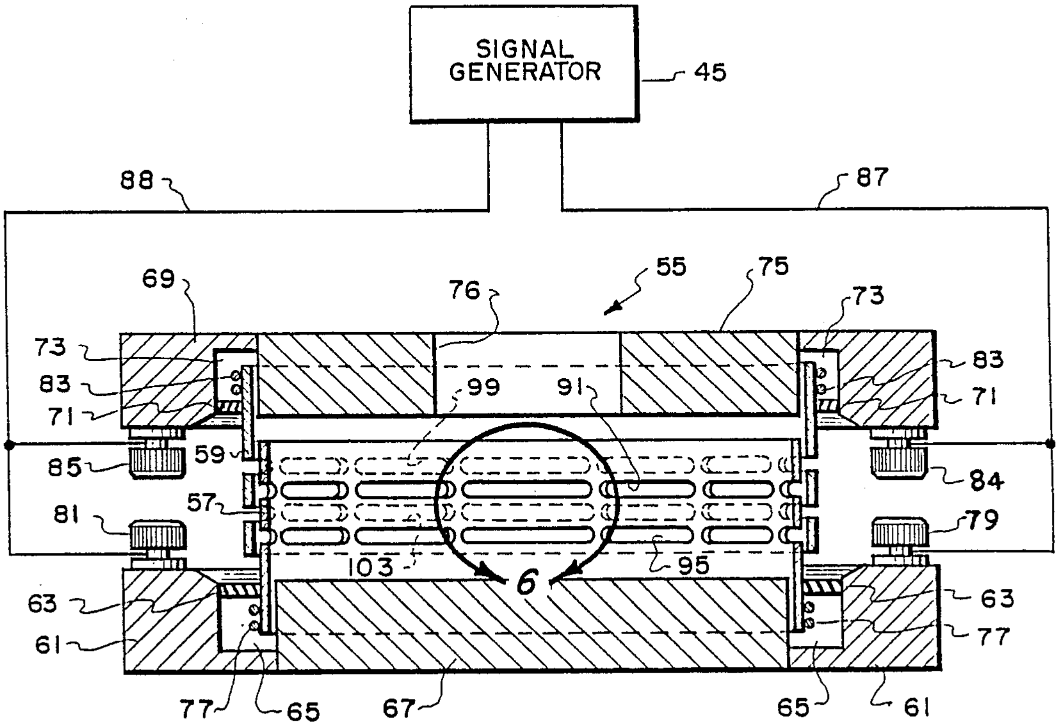
FIG. 5 is a cross sectional view of the double valve mechanism comprising the present invention.

Referring now to FIGS. 1 and 5 there is shown an improved double valve mechanism 55 for use with acoustic modulator 10. Valve mechanism 55 comprises a pair of cylindrical shaped members 57 and 59 with member 57 being position inside of member 59. In the preferred embodiment member 59 has an outside diameter of 3 inches, member 57 has an outside diameter of 2.85 inches, each member is fabricated from 0.025 inch thick aluminum, and each member is one half inch in height.

Cylindrical shaped member 57 is secured to a support member 61 by a flexible material 63. Flexible material 63 can be any rubberized compound or elastomeric material which allows movement of cylindrical shaped member 57 within a gap or opening 65 located between support member 61 and a circular shaped permanent magnet 67 for generating a magnetic field positioned within support member 61. Similarly, cylindrical shaped member 59 is secured to a support member 69 by a flexible material 71 which allows movement of cylindrical shaped member 59 within a gap or opening 73 located between support member 69 and a circular shaped permanent magnet 75 for a generating magnetic field positioned within support member 69. Permanent magnet 75 also has an orifice 76 located in the center thereof which will pass modulated air when double valve mechanism is in an open configuration.

Wound around the outer surface and positioned near the lower end of cylindrical shaped member 57 is a coil 77 which may be fabricated from copper or any other electrical conductor. One end of coil 77 is connected to a terminal 79 attached to support member 61 while the other end of coil 77 is connected to a terminal 81 attached to support member 61.

Wound around the outer surface and positioned near the upper end of cylindrical shaped member 59 is a coil 83 which has one end thereof connected to terminal 84 and the opposite end thereof connected to a terminal 85. Terminals 79 and 84 are connected by a wire 87 to the first terminal of signal generator 45, while terminals 81 and 85 are connected by a wire 88 to the second terminal of signal generator 45.

Referring now to FIGS. 5 and 6, there is located in a plane 89 around the circumference of cylindrical shaped member 57 a plurality of elongated ports 91, while there is located in a plane 93 around the circumference of member 57 a plurality of elongated ports 95. There is located in a plane 97 around the circumference of cylindrical shaped member 59 a plurality of elongated ports 99, while there is located in a plane 101 around the circumference of member 59 a plurality of elongated ports 103.

Figure 6A:
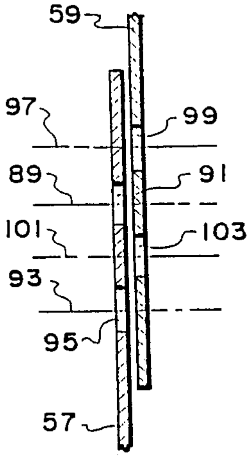

Referring now to FIG. 6 and FIG. 6a ports 91 and 95 are positioned near the upper end of member 57 with the distance between the upper end of member 57 and port 1 being equal to width of port 99 and the distance between ports 91 and 95 being equal to the width of port 103. Ports 99 and 103 are positioned near the lower end of member 59 with the distance between the lower end of member 59 and port 103 being equal to twice the width of port 95, and the distance between ports 99 and 103 being equal to the width of port 91. It should be noted that in the preferred embodiment of the present invention ports 91, 95, 99 and 103 are one sixteenth of an inch wide by eleven sixteenths of an inch long, although it should be understood that the ports could have different dimensions as long as every port has the same width and the same length.

The operation of double valve mechanism 55 will now be discussed in conjunction with FIGS. 5, 6 and 7 of the drawings.

When coils 77 and 83 are excited by electrical signal 46 provided by signal generator 45, the magnetic fields of magnets 67 and 75 will cause a force to be exerted on cylindrical shaped members 57 and 59 thereby imparting movement on members 57 and 59.

Referring now to FIGS. 5 and 7 when electrical sinusoidal input signal 46 provided by generator 45 goes positive members 57 and 59 will move in the direction indicated by the arrows thereby aligning ports 91 and 103 and opening ports 99 since member 57 no longer shuts off the flow of air through ports 99. Valve mechanism 55 is now in an open position allowing air to flow through align ports 91 and 103 and open ports 99.

When signal 46 returns to zero members 57 and 59 will return to a nonenergized position, thereby shutting off the flow of air through double valve mechanism 55 since ports 91 and 103 are pulled out of alignment and ports 99 are closed by member 57.

When signal 46 goes negative, members 57 and 59 will move in the direction indicated by the arrows thereby aligning ports 95 with ports 103 and aligning ports 91 with ports 99, opening double valve mechanism 55 and allowing air to flow through double valve mechanism 55.

When signal 46 again returns to zero ports 95 will be pulled out of alignment with ports 103 and ports 91 will be pulled out of alignment with ports 99, thereby shutting off the flow of air through double valve mechanism 55.

This results in an acoustic energy output waveform 105 being generated by acoustic modulator 10 which has a frequency that is twice the frequency of electrical sinusoidal input signal 46. If signal 46 has a frequency of 400 hertz, the acoustic energy output signal generated by acoustic modulator 10 will have a frequency of 800 hertz. Thus, double valve mechanism 55 functions as an acoustic full wave rectifier, that is double valve mechanism 55 inverts the negative going waveform of signal 46 thereby generating the full wave acoustic rectified signal 105 of FIG. 7.

As is best illustrated in FIG. 8, the prior art valve mechanism consumes essentially the maximum amount of air at all levels of modulation and can achieve maximum efficiency only at the maximum modulation level. As is best illustrated in FIG. 9, double valve mechanism 55 consumes air in proportion to the level of modulation, or degree of valve opening which results in a significant energy savings.

In addition, it should be noted that because of halving the linear motion of members 57 and 59 of double valve mechanism 55, there is an increase in total acoustic output, and an enhanced upper frequency performance because of reduced displacement of members 57 and 59. Further, double valve mechanism 55 provides a full wave rectification of the input signal, resulting in a frequency doubling of the input signal, while imposing no additional vibratory requirements on the mechanical components of valve mechanism 55.

Obviously many modifications and variation of the present invention are possible in light of the above teachings. It is therefore to be understood that within the scope of the appended claims that the invention may be practiced otherwise than as specifically described.

What is claimed is:

1. A valve mechanism for an acoustic modulator comprising:

first and second cylindrical shaped members with said first cylindrical shaped member being positioned inside of said second cylindrical shaped member;

first and second support members;

said first cylindrical shaped member having at least a first plurality of ports located in a plane near the upper end thereof, and a second plurality of ports located in a plane below said first plurality of ports;

said second cylindrical shaped member having at least a first plurality of ports located in a plane near the lower end thereof, and a second plurality of ports located in a plane above said first plurality of ports;

spring means connecting said first cylindrical shaped member to said first support member and said second cylindrical shaped member to said second support member;

first and second driver means, said first driver means being positioned near the lower end of said first cylindrical shaped member and said second driver means being positioned near the upper end of said second cylindrical shaped member; and said first and second driver means being excited by an electrical sinusoidal input signal so as to cause movement of said first and second cylindrical shaped members thereby obstructing or permitting the passage of air through the ports of said first and second cylindrical shaped members such that the pulse shape of an acoustic energy output waveform provided by said valve mechanism is full-wave rectified and has a frequency twice the frequency of said electrical sinusoidal input signal.

2. The valve mechanism of claim 1 wherein said spring means comprises a rubberized compound.

3. The valve mechanism of claim 1 wherein said spring means comprises an elastomeric material.

4. The valve mechanism of claim 1 wherein said first driver means comprises:

a coil wound around the outer surface near the lower end of said first cylindrical shaped member; and a permanent magnet positioned such that there is an opening between said magnet and said first support member so as to allow movement of said first cylindrical shaped member within said opening.

5. The valve mechanism of claim 1 wherein said second driver means comprises:

a coil wound around the outer surface near the upper end of said second cylindrical shaped member; and a permanent magnet positioned such that there is an opening between said magnet and said second support member so as to allow movement of said second cylindrical shaped member within said opening.

6. The valve mechanism of claim 1 further characterized by generating means connected to said first and second driver means for providing said electrical sinusoidal input signal so as to cause movement of said first and second cylindrical shaped members.

7. A double valve mechanism for an acoustic modulator comprising:

first and second cylindrical shaped members with said first cylindrical shaped member being positioned inside of said second cylindrical shape member;

first and second support members;

a flexible material adapted to secure said first cylindrical shaped member to said first support member and to secure said second cylindrical shaped member to said second support member;

first and second magnets, said first magnet being positioned such that there is a first opening between said first magnet and said first support member so as to allow movement of said first cylindrical shaped member within said first opening and said second magnet being positioned such that there is a second opening between said second magnet and said second support member so as to allow movement of said second cylindrical shaped member within said second opening;

said first cylindrical shaped member having a first plurality of elongated ports located in a plane near the upper end thereof, a second plurality of elongated ports located in a plane below said first plurality of elongated ports and a coil wound around the outer surface and positioned near the lower end thereof;

said second cylindrical shaped member having a first plurality of elongated ports located in a plane near the lower end thereof, a second plurality of elongated ports located in a plane above said first plurality of elongated ports and a coil wound around the outer surface and positioned near the upper end thereof;

each of the coils of said first and second cylindrical shaped members being excited by a sinusoidal input signal to cause movement of said first and second cylindrical shaped members, the positive portion of said sinusoidal input signal causing said cylindrical shaped members to move such that the first plurality of ports of said first cylindrical shaped member align with the first plurality of ports of second cylindrical shaped member thereby allowing air to pass through said double valve mechanism, the negative portion of said sinusoidal input signal causing said cylindrical shaped members to move such that the first plurality of ports of said first cylindrical shaped member align with the second plurality of ports of second cylindrical shaped member and the second plurality of ports of said first cylindrical shaped member align with the first plurality of ports of second cylindrical shaped member thereby allowing air to pass through said double valve mechanism ports and the zero portion of said sinusoidal input signal allowing the ports of said first and second cylindrical shaped members to be pulled out of alignment by said flexible material so as to prevent the passage of air through said double valve mechanism.

8. The double valve mechanism of claim 7 wherein said first and second magnets are permanent magnets.

9. The double valve mechanism of claim 7 further characterized by a signal generator having first and second terminals, the first terminal of which is connected to one end of the coils of said first and second cylindrical shaped members and the second terminal of which is connected to the opposite end of the coils of said first and second cylindrical shaped members.

10. The double valve mechanism of claim 7 further characterized by first, second, third, and fourth electrical terminals, said first and second terminals being mounted on said first support member and said third and fourth terminals being mounted on said second support member.

* * * * *